United States Patent
Liang et al.

(10) Patent No.: US 9,077,416 B2
(45) Date of Patent: Jul. 7, 2015

(54) METHOD AND APPARATUS FOR DEMODULATING DOWNLINK CHANNEL IN COMMUNICATION SYSTEM AND BASEBAND CHIP

(71) Applicant: Spreadtrum Communications (Shanghai) Co., Ltd., Shanghai (CN)

(72) Inventors: Jingxin Liang, Shanghai (CN); Yu Dong, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 13/731,391

(22) Filed: Dec. 31, 2012

(65) Prior Publication Data
US 2014/0185720 A1 Jul. 3, 2014

(51) Int. Cl.
H04B 15/00 (2006.01)
H04B 7/08 (2006.01)
(52) U.S. Cl.
CPC ........................................ H04B 7/08 (2013.01)
(58) Field of Classification Search
CPC ....... H04L 1/06; H04L 1/1893; H04L 5/0053; H04B 7/02; H04B 7/0413
USPC .................. 375/259–285, 316–350
See application file for complete search history.

(56) References Cited

U.S. PATENT DOCUMENTS

| | | | |
|---|---|---|---|
| 2007/0147227 A1 | 6/2007 | Jaenecke | |
| 2009/0245431 A1* | 10/2009 | Challa et al. | 375/340 |
| 2010/0284347 A1 | 11/2010 | Ahn et al. | |
| 2011/0085458 A1 | 4/2011 | Montojo et al. | |
| 2013/0294547 A1 | 11/2013 | Lane et al. | |
| 2014/0105087 A1* | 4/2014 | Gupta et al. | 370/311 |

FOREIGN PATENT DOCUMENTS

| | | |
|---|---|---|
| CN | 101201800 A | 6/2008 |
| CN | 101287122 A | 10/2008 |
| CN | 101374340 A | 2/2009 |
| CN | 102158446 A | 8/2011 |
| CN | 102255840 A | 11/2011 |
| CN | 102271402 A | 12/2011 |
| WO | 2011081735 A1 | 7/2011 |

OTHER PUBLICATIONS

Office Action dated Nov. 28, 2013 in Chinese Patent Application No. 201110431051.6, with English Notification sheet, 12 pages.

(Continued)

*Primary Examiner* — Sam K Ahn
*Assistant Examiner* — James M Perez
(74) *Attorney, Agent, or Firm* — Vierra Magen Marcus LLP

(57) ABSTRACT

The present disclosure provides a method and an apparatus for demodulating a downlink channel in a communication system, and a baseband chip. The demodulation method may include: obtaining RE data corresponding to the downlink channel successively from an OFDM symbol; demodulating the RE data to obtain demodulated data; filling the demodulated data to a corresponding position in a downlink channel buffer; and proceeding to obtain RE data corresponding to the downlink channel successively from a next OFDM symbol if a sequence number of the OFDM symbol does not reach a predetermined number. The present disclosure saves buffer space of the baseband chip in a UE.

17 Claims, 5 Drawing Sheets

(56) References Cited

OTHER PUBLICATIONS

English Abstract of CN102255840A dated Nov. 23, 2011, 2 pages.
English Abstract of CN101374340A dated Feb. 25, 2009, 2 pages.
English Abstract of CN102271402A dated Dec. 7, 2011, 2 pages.
Office Action dated Nov. 29, 2013 in Chinese Patent Application No. 201110431033.8, with English notification sheet, 12 pages.
English Abstract of CN101287122A dated Oct. 15, 2008, 2 pages.
U.S. Appl. No. 13/731,405, filed Dec. 31, 2013.
Office Action dated Apr. 15, 2014 in Chinese Patent Application No. 201110431033.8, with English notification sheet, 9 pages.
English Abstract of CN101201800 dated Jun. 18, 2008, 1 page.
English Abstract of CN102158446 dated Aug. 17, 2011, 1 page.
Office Action dated Sep. 17, 2014 in U.S. Appl. No. 13/731,405, 25 pages.
Response to Office Action filed Dec. 17, 2014 in U.S. Appl. No. 13/731,405, 11 pages.
Notice of Allowance dated Feb. 2, 2015 in U.S. Appl. No. 13/731,405, 16 pages.

* cited by examiner

METHOD AND APPARATUS FOR DEMODULATING DOWNLINK CHANNEL IN COMMUNICATION SYSTEM AND BASEBAND CHIP

FIELD OF THE DISCLOSURE

The present disclosure generally relates to mobile communication technology, and more particularly, to a method and an apparatus for demodulating a downlink channel in a communication system, and a baseband chip.

BACKGROUND

Long Term Evolution (LTE) is an evolution of the Third Generation Mobile Communication (3G). It improves and enhances the radio interface technologies of 3G, using Orthogonal Frequency Division Multiplexing (OFDM) and Multiple-Input Multiple-Output (MIMO) as sole standards of its wireless network evolution. LTE can provide 150 Mbit/s peak rate of uplink and 300 Mbit/s peak rate of downlink in 20 MHZ spectral bandwidth. Meanwhile, LTE improves the performance to cell-edge users, increases cell capacity and decreases system delay. Compared with 3G, LTE has advantages of high communication rate and spectrum efficiency, low wireless network delay, continuous area coverage and downward compatibility. However, the implementation of LTE requires a high-level design for User Equipment (UE) terminal, such as high baseband chip's ability to demodulate a downlink channel in a terminal and as little as possible memory space taken in the baseband chip.

In the existing TD-LTE systems, data sent from a base station to a UE includes information carried in multiple channels, such as Physical Broadcast Channel (PBCH), Physical Control Format Indicator Channel (PCFICH), Physical Hybrid ARQ Indicator Channel (PHICH), Physical Downlink Control Channel (PDCCH) and Physical Downlink Shared Channel (PDSCH). Relations among the above channels are as follows: information sent on the PBCH is broadcast information, information in the PCFICH indicates demodulation of the PHICH and the PDCCH, and demodulation information in the PDCCH indicates demodulation of the PDSCH.

Referring to FIG. 1, a baseband chip in a UE may include a FFT (Fast Fourier Transform) processor 11, a FFT buffer 12, a MIMO demodulator 13, a channel estimator 14, a CHE (CHannel Estimation) data buffer 15, a MIMO buffer 16, a RE (Resource Element) data de-multiplexer 17, and buffers and decoders corresponding to each of the above channels. The buffers corresponding to each of the above channels may include a PBCH buffer 181, a PCFICH buffer 182, a PHICH buffer 183, a PDCCH buffer 184 and a PDSCH buffer 185. And the decoders corresponding to each of the above channels may include a PBCH decoder 191, a PCFICH decoder 192, a PHICH decoder 193, a PDCCH decoder 194 and a PDSCH decoder 195.

Referring to FIG. 1, after the UE receives data (including a plurality of OFDM symbols) from the base station, the FFT processor 11 processes the OFDM symbols firstly to form FFT data. The FFT data are stored in the FFT buffer 12. Thereafter, in order to demodulate received data, MIMO demodulating need to be performed on received data and MIMO demodulator 13 extracts channel part in the received data to process it. Meanwhile reference signals in the FFT data are extracted and processed by the channel estimator 14 to obtain channel parameters (channel estimation data), so that a channel estimation data matching with an OFDM symbol are input into the CHE buffer 15. Then the demodulated RE data output by the MIMO demodulator 13 are stored in the MIMO buffer 16. Finally, the demodulated RE data are distributed into buffers of each channel through the de-multiplexer 17 of RE data until the accumulated RE data (being soft-bit data after demodulation) meets a requirement of starting decoding. The decoders 191 to 195 corresponding to each channel perform decoding on the demodulated RE data distributed in each channel.

According to the protocol 3GPP TS 36.211 V8.7.0, a PDCCH has following characteristics different from other channels. Soft-bit data in the PDCCH are distributed in N OFDM symbols in the head of each subframe, wherein the value of N may be 1 to 3 and N is an integer. Furthermore, at the base station, the encoded PDCCH as a whole is interlacedly distributed in the RE data of the N OFDM symbols.

Referring to FIG. 2, soft-bit data in the PDCCH are distributed in OFDM symbol 1, OFDM symbol 2 and OFDM symbol 3, namely, N=3. In the existing methods, during the UE demodulating PDCCH, in order to fill the soft-bit data into a PDCCH buffer in sequence at a time, 3 OFDM symbols need to be cached in the PDCCH firstly. Then RE data are extracted from the OFDM symbols according to interleaving and mapping relations to demodulate. Since CHE data matching with the OFDM symbols are needed during demodulating the RE data, N OFDM symbols and the CHE data matching with the symbols needs to be cached in a baseband chip according to the conventional method, which occupies a lot of memory space.

More information relative to a method for demodulating a downlink channel in a TD-LTE system may refer to US patent publication NO. US2010284347A1 entitled "METHOD FOR ACQUIRING RESOURCE REGION INFORMATION FOR PHICH AND METHOD OF RECEIVING PDCCH", however, which still leaves aforementioned problems unsolved.

SUMMARY

The present disclosure saves memory space of a baseband chip in a UE.

In one embodiment, a method for demodulating a downlink channel in a communication system is provided. The method may include: obtaining RE data corresponding to the downlink channel successively from an OFDM symbol; demodulating the RE data to obtain demodulated data; filling the demodulated data to a corresponding position in a downlink channel buffer; and proceeding to obtain RE data corresponding to the downlink channel successively from a next OFDM symbol if a sequence number of the OFDM symbol does not reach a predetermined number. In some embodiments, the predetermined number may be 3.

Optionally, the corresponding position in the downlink channel buffer is determined by obtaining position information of the RE data in the OFDM symbol, and determine a position mapped to the position information in the downlink channel buffer.

Optionally, the position information of the RE data in the OFDM symbol may include: a sequence number of the OFDM symbol which the RE data belongs to; and a sequence number of the RE data in the OFDM symbol.

Optionally, obtaining RE data corresponding to the downlink channel successively from an OFDM symbol and proceeding to obtain RE data corresponding to the downlink channel successively from a next OFDM symbol if a sequence number of the OFDM symbol does not reach a predetermined number may include: obtaining RE data corresponding to the downlink channel successively from a plurality of OFDM symbols corresponding to the downlink channel according to sequence numbers of the OFDM symbols.

Optionally, obtaining RE data corresponding to the downlink channel successively from an OFDM symbol may include: obtaining RE data corresponding to the downlink channel successively from an OFDM symbol according to a sequence number of the RE data in the OFDM symbol till the sequence number of the RE data in the OFDM symbol is equal to the number of subcarriers of the OFDM symbol in frequency.

Optionally, demodulating the RE data to obtain demodulated data may include: demodulating the RE data to obtain demodulated data based on CHE data matching with the OFDM symbol.

Optionally, the demodulated data is soft-bit data.

Optionally, the communication system is a TD-LTE system and the downlink channel is a PDCCH.

In one embodiment, an apparatus for demodulating a downlink channel in a communication system is further provided. The apparatus may include: an acquiring unit configured to obtain RE data corresponding to the downlink channel successively from an OFDM symbol, and to obtain RE data corresponding to the downlink channel successively from a next OFDM symbol if a sequence number of the OFDM symbol does not reach a predetermined number; a demodulation unit configured to demodulate the RE data to obtain demodulated data according to the RE data corresponding to the downlink channel obtained by the acquiring unit; and a filling unit configured to fill the demodulated data to a corresponding position in the downlink channel buffer.

Optionally, the apparatus for demodulating a downlink channel in a communication system may further include a position determining unit configured to obtain position information of the RE data in the OFDM symbol and determine a position mapped to the position information in the downlink channel buffer.

Optionally, the position information of the RE data in the OFDM symbol may include: a sequence number of the OFDM symbol which the RE data belongs to; and a sequence number of the RE data in the OFDM symbol.

Optionally, the acquiring unit is configured to: obtain RE data corresponding to the downlink channel successively from a plurality of OFDM symbols corresponding to the downlink channel according to sequence numbers of the OFDM symbols.

Optionally, the acquiring unit obtaining RE data corresponding to the downlink channel successively from an OFDM symbol may include: obtaining RE data corresponding to the downlink channel successively from an OFDM symbol according to a sequence number of the RE data in the OFDM symbol till the sequence number of the RE data in the OFDM symbol is equal to the number of subcarriers of the OFDM symbol in frequency.

Optionally, the apparatus for demodulating a downlink channel in a communication system may further include a CHE data receiving unit configured to receive CHE data matching with the OFDM symbol and provide the CHE data for the demodulation unit to demodulate the RE data.

Optionally, the demodulated data is soft-bit data.

Optionally, the communication system is a TD-LTE system and the downlink channel is a PDCCH.

In one embodiment, a baseband chip including the apparatus for demodulating a downlink channel in a communication system is further provided.

Compared with the existing methods, the present disclosure has the following advantages.

In some embodiments, RE data corresponding to the downlink channel is obtained successively from the plurality of OFDM symbols one by one, the RE data is demodulated to obtain demodulated data and the demodulated data is filled to a corresponding position in the buffer of the downlink channel. Before demodulation, the RE data is obtained from the plurality of OFDM symbols one by one. Therefore, only one of the plurality of OFDM symbols and the CHE data matching with the OFDM symbol are cached in a baseband chip to save buffer space of the baseband chip.

In some embodiments, RE data is filled to a buffer of a downlink channel discontinuously according to the mapping relations between a position of the RE data in one of the plurality of OFDM symbols and buffer space of the downlink channel until the last OFDM symbol corresponding to the downlink channel is completed.

The present disclosure saves buffer space of a baseband chip in a UE.

DETAILED DESCRIPTION OF THE DISCLOSURE

The present disclosure provides a method and an apparatus for demodulating a downlink channel in a communication system, and a baseband chip, which saves buffer space of a baseband chip in a UE.

In order to clarify the objects, characteristics and advantages of the disclosure, embodiments of present disclosure will be described in detail in conjunction with accompanying drawings.

However, the present disclosure is not restricted to the embodiments described below.

Figure 3:
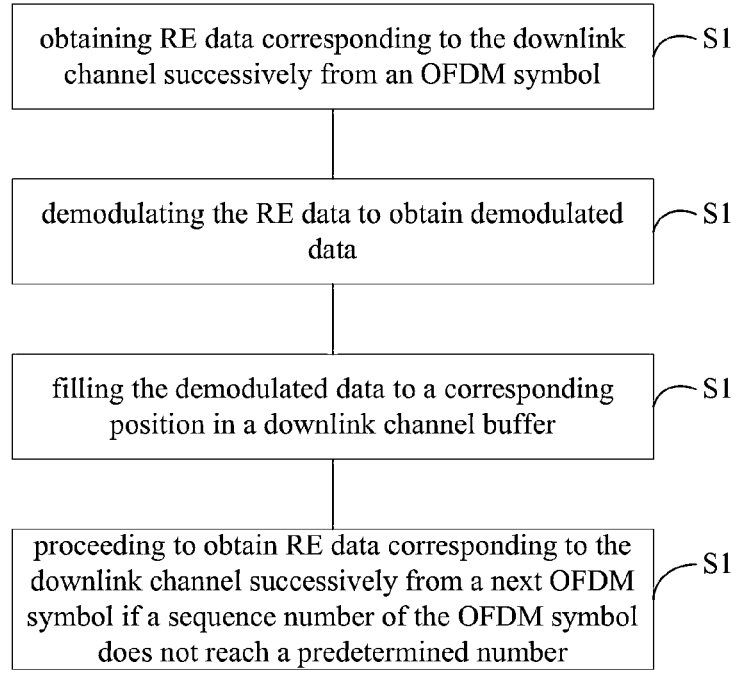
FIG. 3 illustrates a schematic flow chart of a method for demodulating a downlink channel in a communication system in this disclosure.

FIG. 3 illustrates a schematic flow chart of a method for demodulating a downlink channel in a communication system in this disclosure. Referring to FIG. 3, the demodulation method may include the following steps of Step S1, Step S2 and Step S3.

Step S1: obtaining RE data corresponding to the downlink channel successively from an OFDM symbol;

Step S2: demodulating the RE data to obtain demodulated data;

Step S3: filling the demodulated data to a corresponding position in a downlink channel buffer; and Step S4: proceeding to obtain RE data corresponding to the downlink channel successively from a next OFDM symbol if a sequence number of the OFDM symbol does not reach a predetermined number.

In some embodiments, the communication system may be a TD-LTE system and the downlink channel may be a PDCCH. Hereinafter, the method for demodulating a PDCCH in a TD-LTE system is taken for example, which should not unduly limit the scope of the disclosure.

Figure 4A:
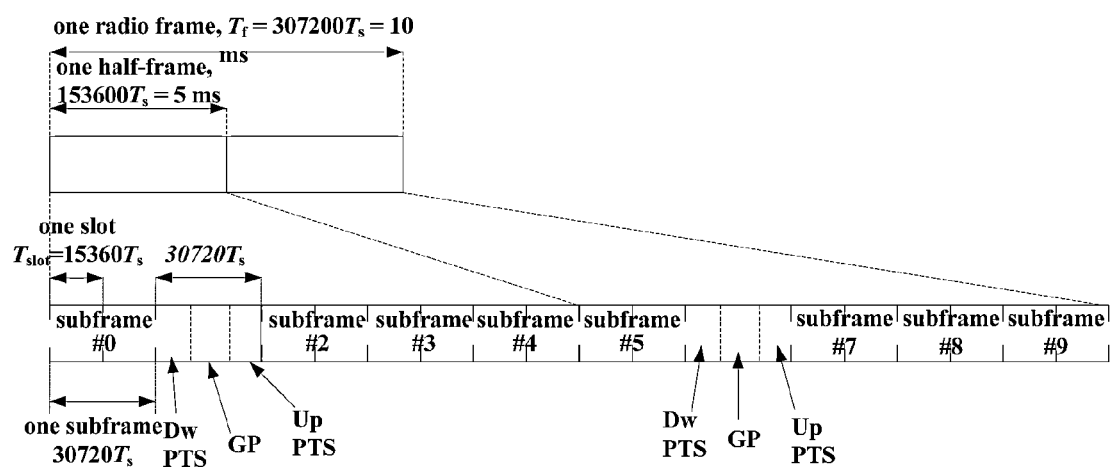
FIG. 4a illustrates a schematic diagram of a TD-LTE frame structure.
Figure 4B:
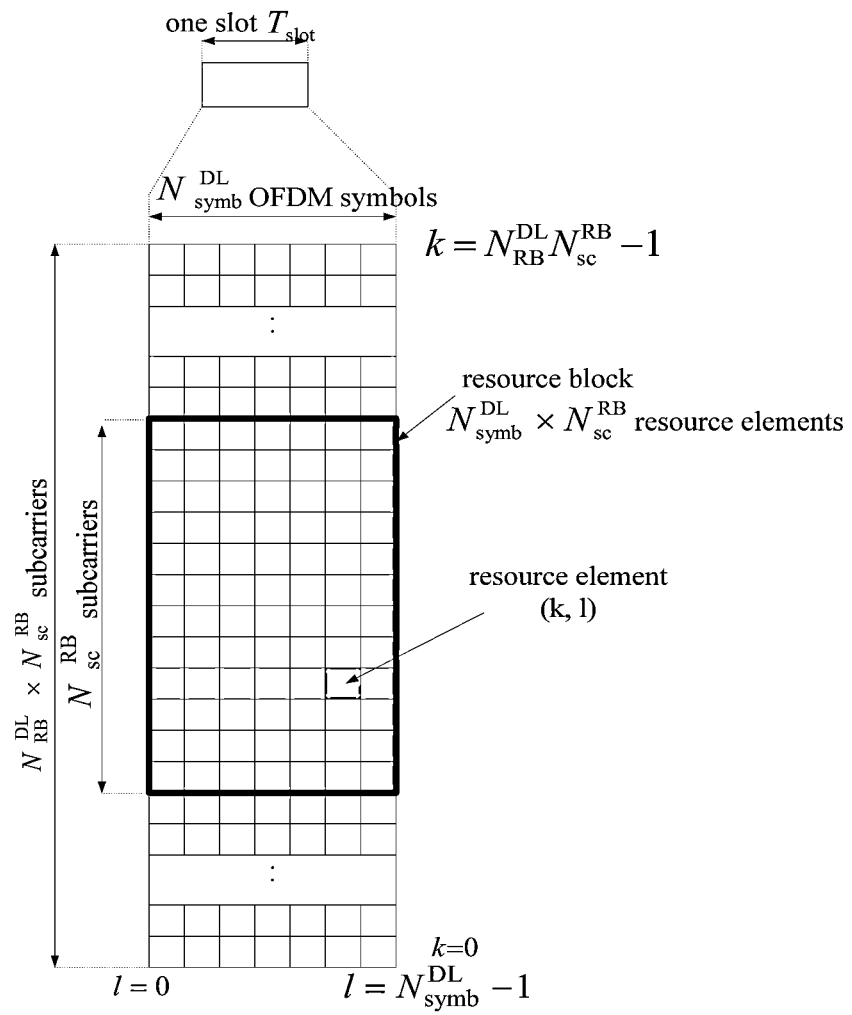
FIG. 4b illustrates a schematic diagram of a radio resource's structure of a slot in a downlink channel in the TD-LTE frame.

To facilitate description of embodiments of present disclosure, a TD-LTE frame structure is described. FIG. 4a illustrates a schematic diagram of a TD-LTE frame's structure and FIG. 4b illustrates a schematic diagram of radio resource structure of a slot in a downlink channel.

Specifically, referring to FIG. 4a, a radio frame having a length, $T_f=307200T_s=10$ ms, includes ten subframes, where the length of each subframe is $30720\ T_s$ and each subframe includes two slots with length $T_{slot}=15360T_s$ each. Referring to FIG. 4b, a slot includes $N_{symb}^{DL}$ OFDM symbols. Each $N_{symb}^{DL}$ OFDM symbol has $N_{RB}^{DL} \times N_{sc}^{RB}$ in frequency. One subcarrier is taken as the smallest radio resource unit, which is referred to as RE data. The numbers of $N_{symb}^{DL}$ and $N_{RB}^{DL} \times N_{sc}^{RB}$ may be set according to relative communication protocols.

Step S1: obtaining RE data corresponding to the downlink channel successively from an OFDM symbol.

In some embodiments, a PDCCH is taken for example. According to communication protocol 3GPPTS TS 36.211 V8.7.0, data in a PDCCH are distributed in N OFDM symbols in the head of each subframe, where the value of N may be 1 to 3. Referring to FIG. 4b, channel data of the PDCCH are distributed in the OFDM symbols with a sequence number l being 0, 1 and 2. Namely, the sequence number of the OFDM symbol corresponding to PDCCH has a predetermined number equal to 3. Therefore, a UE traverses 1 to 3 OFDM symbols in the head of each subframe one by one among the received data sent from a base station, namely, traverses 1 to 3 OFDM symbols in the head of a first slot in each subframe. In practice, the UE generally receives OFDM symbols in an order of the sequence numbers of the OFDM symbols in each subframe. That is, an OFDM symbol with a smaller sequence number is received earlier than an OFDM symbol with a greater sequence number. Therefore, the UE traverses the OFDM symbols in each subframe in the order of the sequence number l as well.

Furthermore, it is known in the art that the PDCCH data sent from a base station is encoded as a whole, and is interlacedly distributed into the RE data in the N OFDM symbols, namely, 1 to 3 OFDM symbols. Referring to FIG. 4b, 1 to 3 OFDM symbols in the head of each subframe includes $N_{RB}^{DL} \times N_{sc}^{RB}$ subcarriers, namely $N_{RB}^{DL} \times N_{sc}^{RB}$ RE data. However, not all of the $N_{RB}^{DL} \times N_{sc}^{RB}$ RE data belongs to the PDCCH information. Therefore, a baseband chip needs to obtain the RE data corresponding to the PDCCH (the RE data belonging to the PDCCH) from the plurality of OFDM symbols one by one and successively.

In some embodiments, each RE data has sole corresponding position information in a OFDM symbol. The position information may include: (1) a sequence number of the OFDM symbol which the RE data belongs to, for example, the sequence number of OFDM symbol l shown in FIG. 4b, it is supposed that the 3 OFDM symbols l of each subframe in the head is 0, 1 and 2 respectively; (2) a sequence number of the RE data in the OFDM symbol, for example, the sequence number k in OFDM symbols shown in FIG. 4b, namely, the sequence number of subcarrier corresponding to the OFDM symbol in frequency. In some embodiments, position information of the RE data in an OFDM symbol may be marked as $Addr_{symb,n}$, wherein 'symb' represents the sequence number of the OFDM symbol which the RE data belongs to and 'n' is the sequence number of the RE data in the OFDM symbol.

Therefore, Step S1 includes: obtaining RE data corresponding to the downlink channel successively from the first OFDM symbol until the sequence number of the RE data in the first OFDM symbol is equal to the number of subcarriers of the OFDM symbol in frequency. Specifically, the RE data corresponding to the PDCCH is obtained successively from an OFDM symbol with the symb=0 till the last RE data in the OFDM symbol is traversed, where the sequence number of the last RE data is $N_{RB}^{DL} \times N_{sc}^{RB}$, namely, $n=N_{RB}^{DL} \times N_{sc}^{RB}$.

Then, obtaining RE data corresponding to the PDCCH successively from a next OFDM symbol (namely, symb=1) till the last RE data in the next OFDM symbol is traversed, where the sequence number of the RE data is $N_{RB}^{DL} \times N_{sc}^{RB}$ namely, $n=N_{RB}^{DL} \times N_{sc}^{RB}$. Performing the process till all the OFDM symbols which include RE data carried in the downlink channel are traversed. In some embodiments, assuming that the data in the PDCCH are distributed in 3 OFDM symbols in the head of each subframe, the above process is performed until the third OFDM symbol (namely, symb=2) is traversed. That is, RE data corresponding to the PDCCH may be obtained successively from a next OFDM symbol if the sequence number of the OFDM symbol does not reach its predetermined number 3.

From above, all the RE data of all the OFDM symbols corresponding to the PDCCH may be traversed. As a result, the RE data corresponding to the PDCCH are obtained.

Step S2: demodulating the RE data to obtain demodulated data.

Specifically, after RE data corresponding to the PDCCH in all the OFDM symbols are obtained, the RE data corresponding to the PDCCH are demodulated in the baseband chip. The demodulation is known to those skilled in the art and is not described in detail. In some embodiments, the RE data may be demodulated by combining with CHE data matching with one of the plurality of OFDM symbols to obtain demodulated data, where the demodulated data is soft-bit data.

Compared with the existing methods, the RE data is obtained successively from the plurality of OFDM symbols one by one and then demodulated in the baseband chip. Therefore, only the FFT data of one of the plurality of OFDM symbols and CHE data matching with the OFDM symbol need to be cached in the baseband chip, thereby saving buffer space of the baseband chip.

Step S3: filling the demodulated data to a corresponding position in a downlink channel buffer. Specifically, mapping relations between position information of the RE data in one of the plurality of OFDM symbols and a PDCCH buffer may be obtained according to communication protocol 3GPPTS TS 36.212 V8.7.0. Namely, in some embodiments, the corresponding position in the buffer may be determined by obtaining position information of the RE data in one of the plurality of OFDM symbols, and determining a position in the buffer of the downlink channel, which is mapped to the position information.

For example, if $Addr_{PDCCH}$ represents an address in the PDCCH buffer and $Addr_{symb,n}$ represents position information of the RE data in one of the plurality of OFDM symbols. The corresponding position in the PDCCH buffer, to which the demodulated data is filled, may be calculated directly or be obtained by referring to a table according to the mapping relations between $Addr_{symb,n}$ and $Addr_{PDCCH}$.

Figure 5:
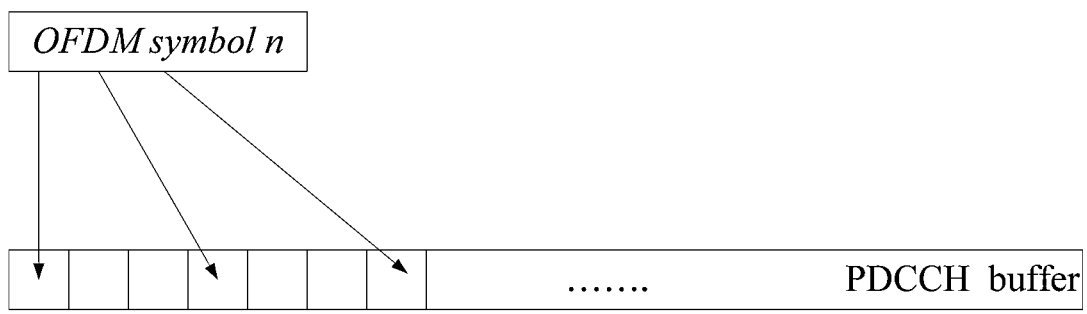
FIG. 5 illustrates a schematic diagram of a method for obtaining RE data from an OFDM symbol to demodulate the RE data and filling the demodulated RE data to a PDCCH buffer in the disclosure.

FIG. 5 illustrates a schematic diagram of a method for obtaining RE data from one of a plurality of OFDM symbols to demodulate the RE data and filling the demodulated RE data to the PDCCH buffer in the disclosure. Then, in S4, proceeding to obtain RE data corresponding to the downlink channel successively from a next OFDM symbol if a sequence number of the OFDM symbol does not reach a predetermined number. More information relating to S4 may refer to the above description in S1.

Figure 1:
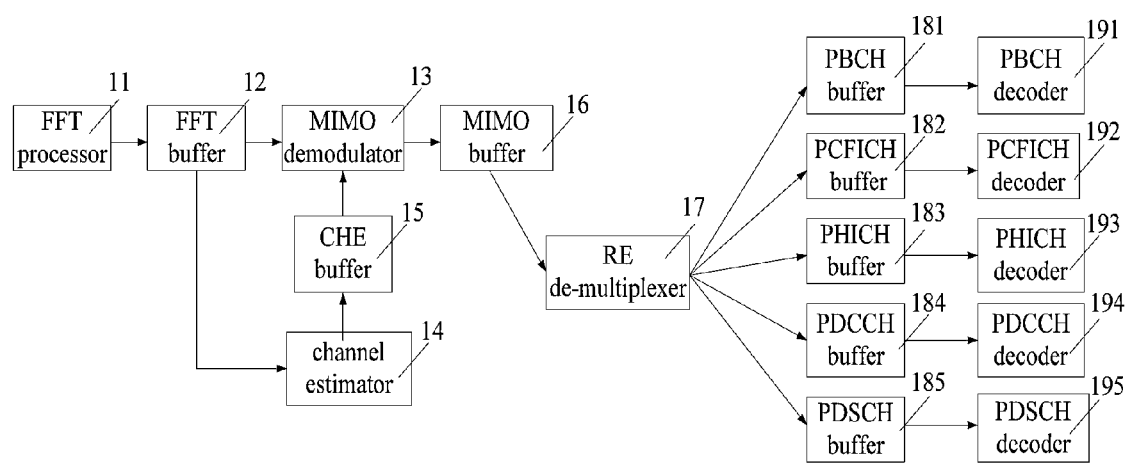
FIG. 1 illustrates a schematic flow chart of a conventional method for processing multiple channels in a UE of a TD-LTE system.
Figure 2:
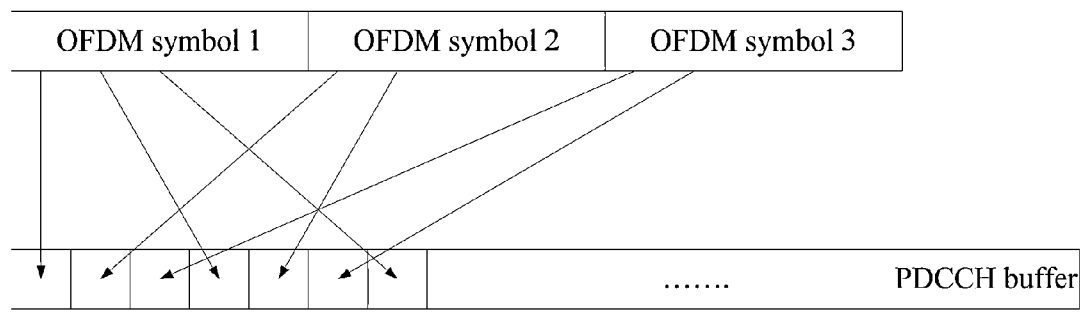
FIG. 2 illustrates a schematic diagram of a conventional method for obtaining and demodulating RE data from an OFDM symbol and filling the demodulated RE data into a PDCCH buffer.

Referring to FIG. 2, in the existing methods, one of a plurality of OFDM symbols is chosen in the order of addresses in the PDCCH buffer. RE data of the chosen OFDM symbol is demodulated to obtain demodulated data. The demodulated data is filled to the PDCCH buffer continuously. As a result, the FFT data of the N OFDM symbols and the CHE data matching with the N OFDM symbols need to be cached in the MIMO buffer at the same time.

In some embodiments of the present disclosure, RE data corresponding to the PDCCH is obtained successively from the plurality of OFDM symbols one by one and then demodulated to obtain demodulated data. The demodulated data is filled to the PDCCH buffer discontinuously. Therefore, only the FFT data of one of the plurality of OFDM symbols and the CHE data matching with the OFDM symbol need to be cached in the the baseband chip, thereby saving buffer space of the baseband chip.

It should be noted, in the above embodiments, a PDCCH in a TD-LTE system is employed to describe the present disclosure. In practice, data of other downlink channels may be demodulated by employing the method in the present disclosure according to characteristics of other downlink channels (including PBCH, PCFICH, PHICH, etc.). The detailed process is not described in detail.

Figure 7:
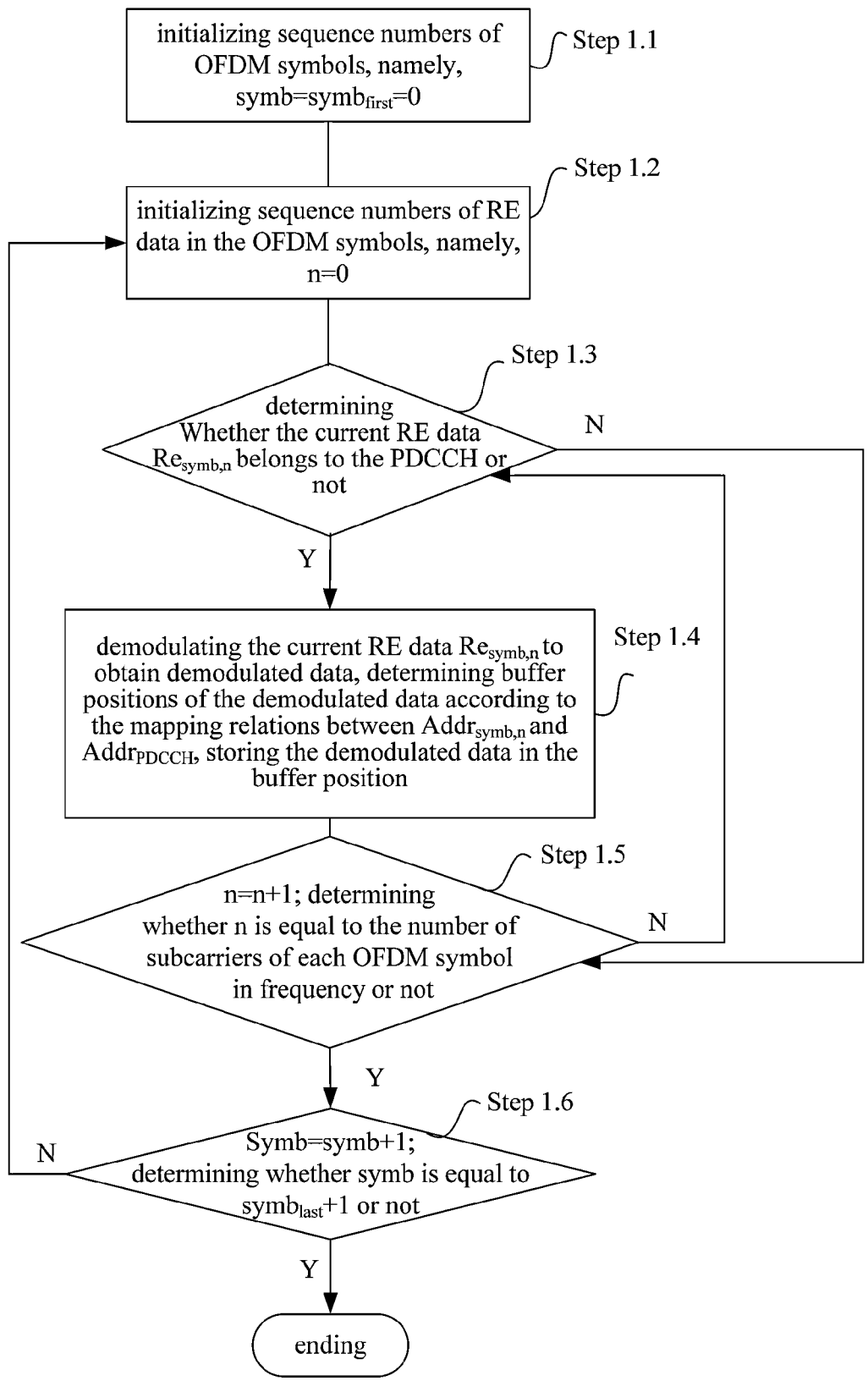
FIG. 7 illustrates a schematic flow chart of a method for demodulating a downlink channel in a communication system according to one embodiment of the present disclosure.

In the following example, the method for demodulating a downlink channel in a communication system is described. For example, data in the PDCCH are distributed in 3 OFDM symbols in the head of each subframe, namely N=3. The sequence number of the first OFDM symbol occupied by the PDCCH is called $symb_{first}$, and $symb_{first}=0$. The sequence number of the last OFDM symbol occupied by the PDCCH is called $symb_{last}$, and $symb_{last}=2$. Refer to FIG. 7.

Step 1.1: initializing sequence numbers of OFDM symbols from the first OFDM symbol, namely $symb=symb_{first}=0$, wherein symb is a sequence number of the OFDM symbol which the current RE data belongs to.

Step 1.2: initializing sequence numbers of RE data from the first RE data in one of the plurality of OFDM symbols, namely n=0, wherein n is a sequence number of RE data in one of the plurality of OFDM symbols.

Step 1.3: determining whether the current RE data $RE_{symb,n}$ belongs to the PDCCH or not, if $RE_{symb,n}$ belongs to the PDCCH, proceeding to Step 1.4; otherwise, proceeding to Step 1.5.

Step 1.4: demodulating the current RE data $RE_{symb,n}$ to obtain demodulated data (soft-bit data), determining a position of the demodulated data in the PDCCH buffer according to the mapping relations between position information $Addr_{symb,n}$ of the RE data $RE_{symb,n}$ and address $Addr_{PDCCH}$ of the PDCCH buffer, storing the demodulated data in the position in the PDCCH buffer.

Step 1.5: n=n+1; determining whether the current RE data $RE_{symb,n}$ is the last RE data in one of the plurality of OFDM symbols or not, namely, whether n is equal to the number $N_{RB}^{DL} \times N_{SC}^{RB}$ of subcarriers of each OFDM symbol in the frequency domain or not. If n is less than $N_{RB}^{DL} \times N_{SC}^{RB}$, proceeding to Step 1.3; and if n is equal to $N_{RB}^{DL} \times N_{SC}^{RB}$, proceeding to Step 1.6.

Step 1.6: symb=symb+1; determining whether all the RE data which belong to the PDCCH are demodulated or not, namely, whether symb equals to $symb_{last}+1$, if symb equals to $symb_{last}+1$, terminating the demodulation of the PDCCH; otherwise, proceeding to Step 1.2.

Figure 6:
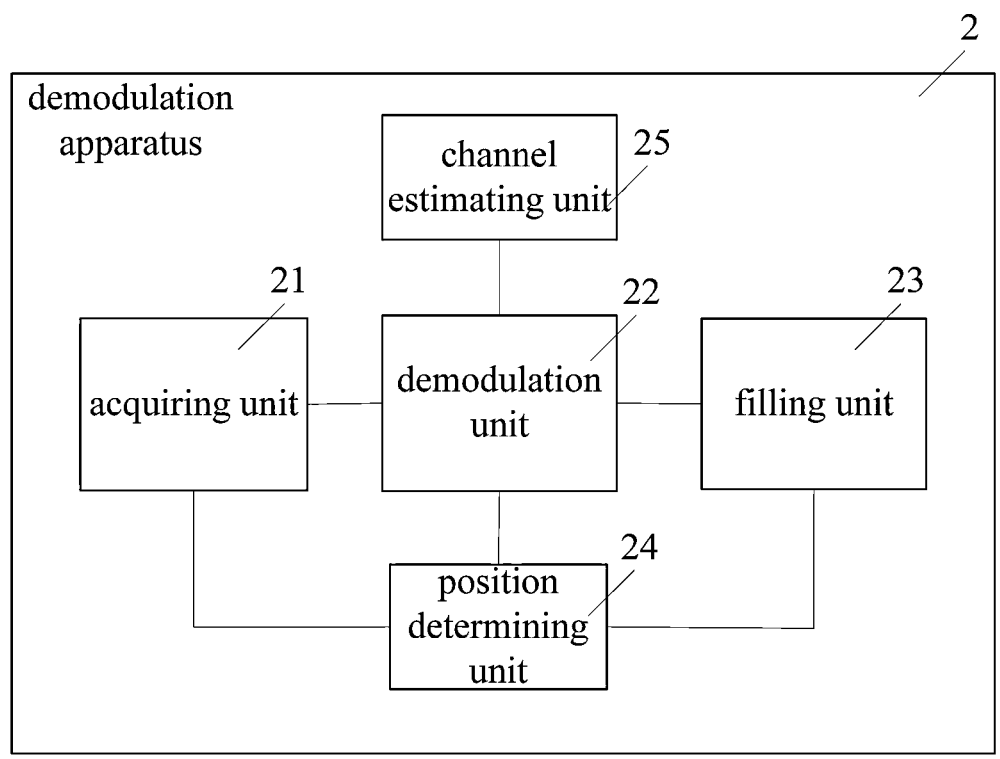
FIG. 6 illustrates a schematic structure diagram of an apparatus for demodulating a downlink channel in a communication system according to one embodiment of the present disclosure.

Embodiments of the present disclosure further provide an apparatus for demodulating a downlink channel in a communication system. Referring to FIG. 6, FIG. 6 illustrates a schematic structure diagram of an apparatus for demodulating a downlink channel in a communication system according to one embodiment of the present disclosure. In some embodiments, the communication system is a TD-LTE system and the downlink channel is a PDCCH, which should not unduly limit the scope of the disclosure.

Referring to FIG. 6, the demodulation apparatus may include: an acquiring unit 21, a demodulation unit 22, a filling unit 23, a position determining unit 24 and a channel estimating unit 25.

Specifically, the acquiring unit 21 is configured to obtain RE data corresponding to the downlink channel successively from an OFDM symbol, and to obtain RE data corresponding to the downlink channel successively from a next OFDM symbol if a sequence number of the OFDM symbol does not reach a predetermined number. In some embodiments, the acquiring unit 21 may obtain RE data corresponding to the downlink channel successively from the plurality of OFDM symbols which include RE data carried in the downlink channel one by one according to the sequence numbers of the OFDM symbols.

Furthermore, the acquiring unit 21 obtaining RE data corresponding to the downlink channel successively from an OFDM symbol may include: obtaining RE data corresponding to the downlink channel successively from an OFDM symbol according to a sequence number of the RE data in the OFDM symbol till the sequence number of the RE data in the OFDM symbol is equal to the number of subcarriers of the OFDM symbol in frequency.

The demodulation unit 22 is configured to demodulate the RE data obtained by the acquiring unit 21 to obtain demodulated data. In some embodiments, the position information of the RE data in one of the plurality of OFDM symbols may include: a sequence number of the OFDM symbol which the RE data belongs to and a sequence number of the RE data in the OFDM symbol.

Furthermore, during the demodulation of the demodulation unit 22, the CHE data receiving unit 25 receives CHE data matching with one of the plurality of OFDM symbols and provides the CHE data to the demodulation unit 22 to demodulate the RE data. The demodulated data is soft-bit data.

The filling unit 23 is configured to fill the demodulated data demodulated by the demodulation unit 22 to a corresponding position in the downlink channel buffer. In some embodiments, when filling the demodulated data to the corresponding position in the buffer of the downlink channel, the filling unit 23 needs to obtain position information of the RE data in one of the plurality of OFDM symbols and determine a position, which is mapped to the position information, in the buffer of the downlink channel.

Embodiments of the present disclosure further provide a baseband chip. Referring to FIG. 6, the baseband chip includes the apparatus for demodulating a downlink channel in a communication system. Specifically, according to the demodulation apparatus in the embodiments of the present disclosure, buffer space of the baseband chip is saved.

In practice, compared with the existing methods, parameters in a TD-LTE system are as follows: BW (Bandwidth)=20 MHZ, RB number (Resource Block Number)=100, number of transmitting antennas is 2, cached data are changed from FFT data of 3 OFDM symbols at most and CHE data matching with the 3 OFDM symbols to FFT data of 1 OFDM symbol and CHE data matching with the 1 OFDM symbol. Each QAM (Quadrature Amplitude Modulation) symbol output by a FFT processor occupies 32 bit of buffer space. Each CHE symbol output by a CHE unit occupies 32 bit of buffer space as well. Therefore, when a MIMO processing is performed on an OFDM symbol, there is 1200*4*2+1200*4*4=28800 Byte buffer space occupied. Compared with the existing methods of 3 OFDM symbols, at most 2*28800 Byte=57600 Byte buffer space may be saved.

In conclusion, in the present disclosure, RE data corresponding to a downlink channel is obtained successively from an OFDM symbol, the RE data is demodulated to obtain demodulated data, and the demodulated data is filled to a corresponding position in a downlink channel buffer. And the RE data corresponding to the downlink channel may be obtained successively from a next OFDM symbol if a sequence number of the OFDM symbol does not reach a predetermined number. Since the RE data is obtained from a plurality of OFDM symbols one by one, only one OFDM symbol and CHE data matching with the OFDM symbol are cached in a baseband chip to save buffer space of the baseband chip. Namely, the present disclosure saves buffer space of the baseband chip in a UE.

Although the present disclosure has been disclosed as above with reference to preferred embodiments thereof but will not be limited thereto. Those skilled in the art can modify and vary the embodiments without departing from the spirit and scope of the present disclosure. Accordingly, without departing from the scope of the present invented technology scheme, whatever simple modification and equivalent variation belong to the protection range of the present invented technology scheme.

What is claimed is:

1. A method for demodulating a downlink channel in a communication system, comprising:
   obtaining and buffering respective resource element (RE) data corresponding to the downlink channel successively for each of a predetermined number of Orthogonal Frequency Division Multiplexing (OFDM) symbols and from only one of the predetermined number of OFDM symbols at a time further comprising:
   obtaining, by an acquiring unit, respective RE data from a one OFDM symbol of the predetermined number of OFDM symbols being processed at the time;
   demodulating, by a demodulation unit, the respective RE data obtained from the one OFDM symbol being processed at the time to obtain respective demodulated data;
   obtaining, by a position determining unit, position information of the respective RE data in the one OFDM symbol being processed at the time;
   determining, by the position determining unit, a respective position in a downlink channel buffer which is mapped to the position information of the respective RE data in the one OFDM symbol being processed at the time; and
   filling, by a filling unit, the respective demodulated data to the respective position in the downlink channel buffer, wherein the respective demodulated data belongs to the one OFDM symbol being processed at the time.

2. The method for demodulating the downlink channel in the communication system according to claim 1, where the position information of the respective RE data within the one OFDM symbol being processed at the time further comprises:
   a sequence number of the one OFDM symbol being processed at the time which the respective RE data belongs to; and
   a sequence number of the respective RE data within the one OFDM symbol being processed at the time.

3. The method for demodulating the downlink channel in the communication system according to claim 2, wherein the sequence numbers of the OFDM symbols are used by the acquiring unit for determining when the predetermined number of OFDM symbols have been obtained.

4. The method for demodulating the downlink channel in the communication system according to claim 2, wherein obtaining, by the acquiring unit, the respective RE data from the one OFDM symbol of the predetermined number of OFDM symbols being processed at the time further comprises:
   obtaining the respective RE data from the one OFDM symbol being processed at the time according to the sequence number of the respective RE data in the one OFDM symbol until the sequence number of the respective RE data in the one OFDM symbol is equal to the number of subcarriers of the one OFDM symbol.

5. The method for demodulating the downlink channel in the communication system according to claim 1, wherein demodulating, by the demodulation unit, the respective RE data obtained from the one OFDM symbol being processed at the time to obtain respective demodulated data further comprises:
   demodulating the respective RE data obtained from the one OFDM symbol being processed at the time to obtain respective demodulated data based on channel estimation (CHE) data matching with the one OFDM symbol being processed at the time.

6. The method for demodulating the downlink channel in the communication system according to claim 1, wherein the demodulated data is soft-bit data.

7. The method for demodulating the downlink channel in the communication system according to claim 1, wherein the communication system is a TD-LTE system and the downlink channel is a PDCCH.

8. An apparatus for demodulating a downlink channel in a communication system, comprising:
   an acquiring unit configured to obtain respective resource element (RE) data corresponding to the downlink channel successively from each of a predetermined number of Orthogonal Frequency Division Multiplexing (OFDM) symbols and from only one of the predetermined number of OFDM symbols at a time, including the acquiring unit being further configured to:
      obtain respective RE from a one OFDM symbol of the predetermined number of OFDM symbols being processed at the time, and
   a demodulation unit configured to demodulate the respective RE data obtained from the one OFDM symbol being processed at the time to obtain respective demodulated data according to the respective RE data corresponding to the downlink channel obtained by the acquiring unit;

a position determining unit configured to obtain position information of the respective RE data in the one OFDM symbol being processed at the time and to determine a respective position in a downlink channel buffer which is mapped to the position information of the respective RE data in the one OFDM symbol being processed at the time; and a filling unit configured to fill the respective demodulated data to the respective position in the downlink channel buffer, and wherein the respective demodulated data processed by the filling unit belongs to the one OFDM symbol being processed at the time.

9. The apparatus for demodulating the downlink channel in the communication system according to claim 8, where the position information of the respective RE data in the one OFDM symbol being processed at the time further comprises:

a sequence number of the one OFDM symbol being processed at the time which the respective RE data belongs to; and a sequence number of the respective RE data within the one OFDM symbol being processed at the time.

10. The apparatus for demodulating the downlink channel in the communication system according to claim 9, where the acquiring unit is further configured to:

obtain the respective RE data corresponding to the downlink channel successively from each of the predetermined number of OFDM symbols and from only one of the predetermined number of OFDM symbols at a time, according to the sequence numbers of the predetermined number of OFDM symbols.

11. The apparatus for demodulating the downlink channel in the communication system according to claim 10, wherein the acquiring unit is further configured to:

obtain RE data corresponding to the downlink channel successively from the one OFDM symbol being processed at the time according to the sequence number of the RE data within the one OFDM symbol being processed at the time until the sequence number of the RE data within the one OFDM symbol being processed at the time is equal to the number of subcarriers of the one OFDM symbol.

12. The apparatus for demodulating the downlink channel in the communication system according to claim 8, further comprising:

a channel estimation (CHE) data receiving unit configured to receive CHE data matching with the one OFDM symbol being processed at the time and provide the CHE data to the demodulation unit to demodulate the respective RE data of the one OFDM symbol being processed at the time.

13. The apparatus for demodulating the downlink channel in the communication system according to claim 8, wherein the demodulated data is soft-bit data.

14. The apparatus for demodulating the downlink channel in the communication system according to claim 8, wherein the communication system is a TD-LTE system and the downlink channel is a PDCCH.

15. A baseband chip comprising an apparatus for demodulating a downlink channel in a communication system, the apparatus comprises:

an acquiring unit configured to obtain respective resource element (RE) data corresponding to the downlink channel successively from each of a predetermined number of Orthogonal Frequency Division Multiplexing (OFDM) symbols and from only one of the predetermined number of OFDM symbols at a time, including the acquiring unit being further configured to:

obtain respective RE data from a one OFDM symbol of the predetermined number of OFDM symbols being processed at the time, a demodulation unit configured to demodulate the respective RE data obtained from the one OFDM symbol being processed at the time to obtain respective demodulated data according to the respective RE data corresponding to the downlink channel obtained by the acquiring unit;

a position determining unit configured to obtain position information of the respective RE data in the one OFDM symbol being processed at the time and to determine a respective position in a downlink channel buffer which is mapped to the position information of the respective RE data in the one OFDM symbol being processed at the time; and a filling unit configured to fill the respective demodulated data to the respective position in the downlink channel buffer, and wherein the respective demodulated data processed by the filling unit belongs to the one OFDM symbol being processed at the time.

16. The baseband chip according to claim 15, where the acquiring unit is further configured to:

obtain the RE data corresponding to the downlink channel successively from each of the predetermined number of OFDM symbols and from only one of the predetermined number of OFDM symbols at a time, according to the sequence numbers of the predetermined number of OFDM symbols.

17. The baseband chip according to claim 16, where the acquiring unit is further configured to:

obtain the RE data corresponding to the downlink channel successively from the one OFDM symbol being processed at the time according to a sequence number of the RE data within the one OFDM symbol being processed at the time until the sequence number of the RE data within the one OFDM symbol being processed at the time is equal to the number of subcarriers of the one OFDM symbol.

* * * * *